(12) United States Patent
Bowe et al.

(10) Patent No.: US 12,733,566 B2
(45) Date of Patent: Sep. 15, 2026

(54) SOIL COMPRESSING BLOCKER WITH MOLDED PLUNGER FOR SEED STARTING

(71) Applicant: Johnny's Selected Seeds, Winslow, ME (US)

(72) Inventors: Graham Bowe, Langhorne, PA (US); Bradford Waugh, Decatur, GA (US); Arthur Haines, Winslow, ME (US); Ronald DiGravio, Winthrop, ME (US)

(73) Assignee: Johnny's Selected Seeds

( * ) Notice: Subject to any disclaimer, the term of this patent is extended or adjusted under 35 U.S.C. 154(b) by 0 days.

(21) Appl. No.: 18/614,562

(22) Filed: Mar. 22, 2024

(65) Prior Publication Data

US 2025/0295054 A1 Sep. 25, 2025

(51) Int. Cl.

*A01C 5/02* (2006.01)
*A01C 7/00* (2006.01)
*A01G 9/08* (2006.01)

(52) U.S. Cl.

CPC ................ *A01C 5/02* (2013.01); *A01C 7/002* (2013.01); *A01G 9/081* (2013.01)

(58) Field of Classification Search

CPC ............ A01G 9/081; A01C 5/02; A01C 7/002
See application file for complete search history.

(56) References Cited

U.S. PATENT DOCUMENTS

| | | | | | |
|---|---|---|---|---|---|
| 323,419 | A * | 8/1885 | Hiller | A01C 5/02 | 111/99 |
| 500,476 | A * | 6/1893 | Douthit | A01C 5/02 | 111/99 |
| 1,183,653 | A * | 5/1916 | Kring | A01C 5/02 | 111/99 |
| 1,498,628 | A * | 6/1924 | Herr | A01C 5/02 | 111/99 |
| 1,554,062 | A * | 9/1925 | Zelenski | A01C 5/02 | 111/99 |
| 1,564,721 | A * | 12/1925 | Tallon | A01C 5/02 | 33/669 |
| 2,044,871 | A * | 6/1936 | Beasley | A01C 5/02 | 111/99 |
| 2,747,528 | A * | 5/1956 | Hunkins | A01C 5/00 | 222/510 |
| 3,332,376 | A * | 7/1967 | Saunoris | A01C 5/02 | 111/99 |
| 3,571,971 | A * | 3/1971 | Broersma | A01G 9/088 | 47/1.01 R |

(Continued)

FOREIGN PATENT DOCUMENTS

| | | | |
|---|---|---|---|
| CH | 85031 | A * | 5/1920 |
| CH | 300835 | A * | 8/1954 |

(Continued)

*Primary Examiner* — Jessica B Wong
(74) *Attorney, Agent, or Firm* — Gearhart Law LLC

(57) ABSTRACT

A plunger device for making soil blocks. The plunger device is used to form soil blocks in a grid to facilitate seedling growth. The plunger is made of a configuration and material by casting or molding to compress soil consistently and evenly into blocks for seeding. The plunger device includes a plurality of plungers joined together that align with the rows of cells within the grid. The benefit of cast or molded plungers of the present invention is their uniform shape that will not bend of deform as prior sheet metal plungers potentially can.

17 Claims, 6 Drawing Sheets

(56) References Cited

U.S. PATENT DOCUMENTS

| | | | | | |
|---|---|---|---|---|---|
| 4,020,881 | A * | 5/1977 | Nothen | A01G 9/081 53/239 |
| 4,036,126 | A * | 7/1977 | Gundersen | A01G 9/081 172/554 |
| 4,261,270 | A * | 4/1981 | Nichols | A01C 7/16 111/91 |
| 4,934,289 | A * | 6/1990 | Robinson | A01C 5/02 111/99 |
| 5,152,348 | A * | 10/1992 | Flanagan, Sr. | A01B 45/023 111/99 |
| D371,493 | S * | 7/1996 | Beaulieu | D8/7 |
| 5,813,471 | A * | 9/1998 | Ramsey | A01B 1/243 D8/13 |
| 6,289,828 | B1 * | 9/2001 | Wittenberg | A01C 5/02 111/96 |
| 6,920,938 | B1 * | 7/2005 | Rotan | A01B 45/02 172/21 |
| 8,056,646 | B2 * | 11/2011 | Broadstone | A01C 5/02 172/378 |
| 9,894,828 | B1 * | 2/2018 | Armstrong | A01C 5/02 |
| 11,166,405 | B1 * | 11/2021 | Rogers | A01C 5/02 |
| D1,011,385 | S * | 1/2024 | Hong | D8/1 |
| D1,037,800 | S * | 8/2024 | Cao | D8/1 |
| 2011/0061882 | A1 * | 3/2011 | Broadstone | A01C 5/02 172/362 |
| 2014/0262367 | A1 * | 9/2014 | St. Romain | A01B 45/023 172/1 |
| 2014/0338578 | A1 * | 11/2014 | Pratt | A01C 5/02 111/99 |
| 2017/0251752 | A1 * | 9/2017 | Baghdadi | A43C 15/161 |
| 2022/0007566 | A1 * | 1/2022 | Kachlany | A01C 5/02 |

FOREIGN PATENT DOCUMENTS

| | | | | |
|---|---|---|---|---|
| DE | 483096 | C * | 9/1929 | |
| DE | 202015005416 | U1 * | 10/2015 | A01C 5/02 |
| FR | 2028661 | A1 * | 10/1970 | |
| GB | 190911569 | A * | 9/1909 | |
| GB | 472374 | A * | 9/1937 | |
| GB | 703542 | A * | 2/1954 | |
| GB | 891657 | A * | 3/1962 | |
| GB | 1516275 | A * | 6/1978 | A01G 24/60 |
| GB | 2146215 | A * | 4/1985 | A01G 24/60 |
| GB | 2233537 | A * | 1/1991 | A01B 1/24 |
| GB | 2557971 | A * | 7/2018 | A01B 1/243 |
| WO | WO-9417651 | A1 * | 8/1994 | A01C 5/02 |
| WO | WO-2004077929 | A1 * | 9/2004 | A01C 5/02 |

* cited by examiner 100
102
120
126
108
124
132
104
101
106
122

SOIL COMPRESSING BLOCKER WITH MOLDED PLUNGER FOR SEED STARTING

BACKGROUND OF THE INVENTION

1. Field of the Invention

The present invention relates to a device that compresses damped soil into small square and rectangular blocks for seed starting. More particularly, the present invention relates to consistently compressing soil within a grid to form a series of blocks ready for sowing seeds. The tool is used for growing seeds for farming or gardening.

2. Description of the Prior Art

Seed starting has commonly been performed by filling thermoformed plastic trays with soil and then sowing seeds into each cell within the plastic tray. The seeds then grow in the cell until they are ready for transplanting. The cells in this plastic tray support the soil while the seed germinates and grows. Alternatively, there are soil blockers available on the market that, instead of using cell trays, compress dampened soil into uniform square or rectangular cubes of soil blocks that are ready to accept seeds when the compressing process is complete. That is, there is no plastic cell tray used to maintain the shape of the soil block while the seeds grow, although the soil blocks may be kept on a flat tray. Variations of this device can compress as few as four cells of soil or more than 200 cells in one compression. All soil blocker devices are designed with plungers and grids made out of sheet metal or plastic. The grid is used to establish a frame or a set of frames for forming the soil block but are not maintained in position after the soil block has been formed. Sheet metal is an ideal material for fabricating grids, but simple sheets of metal alone are not ideal for making plungers because the thin metal can bend or deform during use.

There exists in the marketplace a wide variety of soil blocking mechanisms, from molded hand-held models to full tray sized units. Nearly all of the products available today compress soil blocks with fabricated sheet metal plungers. One handheld model with a molded plastic plunger compresses soil into dome shaped forms which is suitable for home gardening but not commercial use due to the inefficient dome shape formed. In addition, plastic and sheet metal plungers cannot optimally withstand the rigors of high volume commercial-scale soil compression. What is needed is a soil blocker capable of forming seed-growing soil cubes without the need for a plastic cell tray wherein the formed cubes are of substantially uniform shape that can be implemented in a commercial environment. The soil blocker should be reusable with consistent soil block formation after repeated contact with an underlying rigid substrate, such as the grid.

SUMMARY OF THE INVENTION

The present invention provides a soil blocker device capable of forming seed-growing soil cubes that are of substantially uniform shape. The soil blocker of the present invention can be implemented in a commercial environment The soil blocking device of the present invention includes a cast or molded plunger or set of plungers that will not deform and bend under typical soil compressing use, including when the plunger makes contact with an underlying substrate, such as the grid made of a metal or other relatively stiff material. The cast or molded plunger may be made of a metal material or a nonmetallic material, such as a plastic material. The cast or molded plunger of the invention forms the full surface area of the plunger that makes contact with and compresses the soil providing a uniform compression in each cell after repeated use.

DETAILED DESCRIPTION OF THE INVENTION

Figure 1:
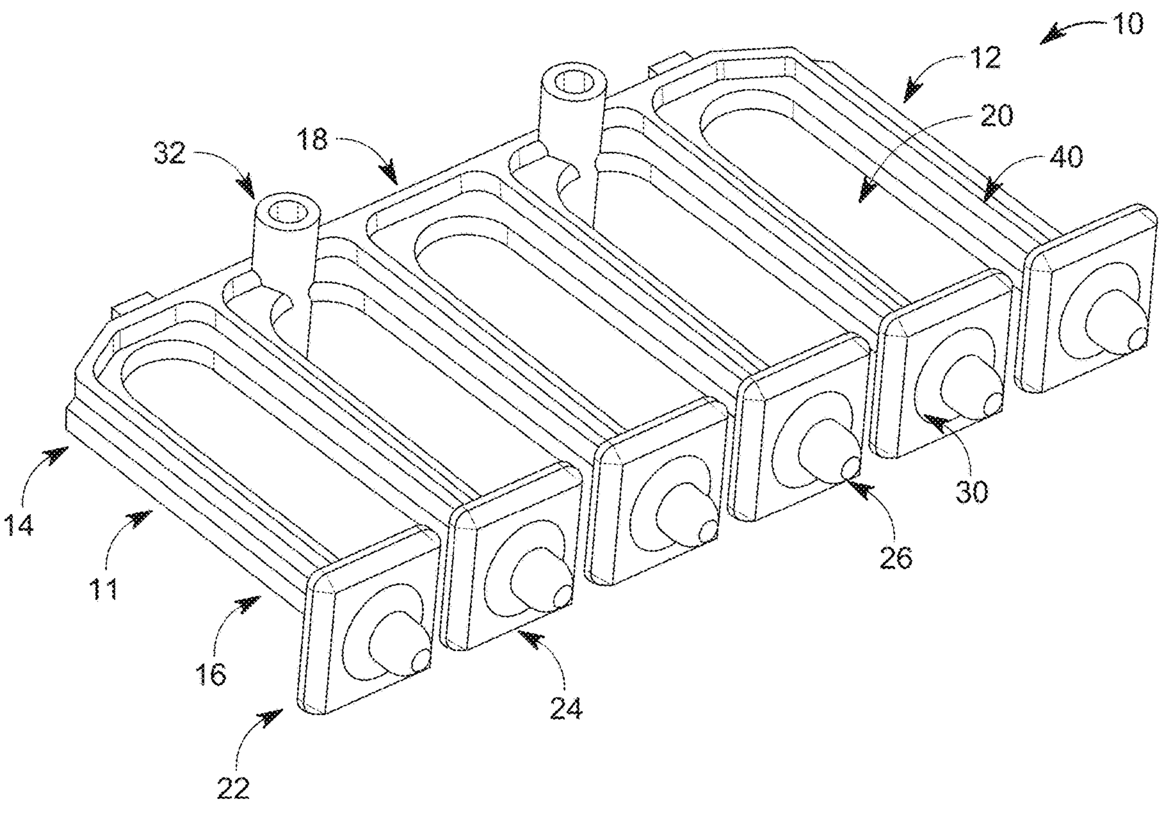
FIG. 1 is a first perspective side view of a first embodiment of the plunger device for soil blocking of the present invention.
Figure 2:
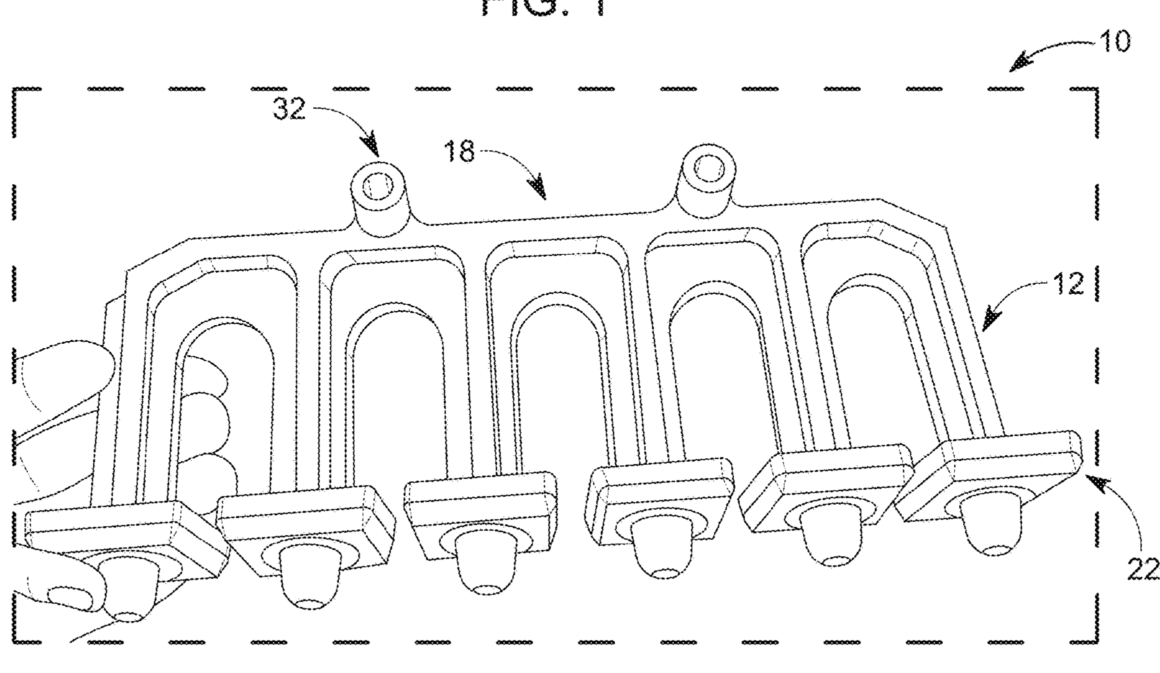
FIG. 2 is a second perspective side view of the plunger device of FIG. 1.

A first embodiment of a soil blocking plunger device 10 of the present invention is shown in FIGS. 1 and 2. The plunger device 10 is shown as a single row of a plurality of plungers 12. Each plunger 12 has a main body 11 with an upper section 14, and a lower section 16. The upper sections 14 of each plunger 12 are joined together at joining body 18. That is, the plungers 12 are joined together, but they are only joined together at their upper sections 14. The plungers 12 are spaced from another by space 20 wherein the lower sections 16 are not joined to each other. The spacing of one plunger from an adjacent plunger defined by space 20 is selectable and may be determined by the desired size of a soil block to be formed. While the plungers 12 are shown fixedly joined together at their respective upper sections 14, they may be removably joined together, such as with screws, for example.

The lower section 16 of each plunger 12 is joined to an end cap 22. The end cap 22 may be fixedly or removably joined to the lower section 16 of the plunger 12. For example, if there is an interest in changing the shape of a soil block to be formed or if an end cap 22 is damaged or worn, the end cap 22 may be removably joined to the lower section 16 of the plunger 12. The end cap 22 includes a base 24 and a dibble 26. The base 24 is shaped to fit snugly within a grid frame used to form one or more soil blocks, such as the grid frame 28 shown in FIGS. 3 and 4. The dibble 26 is shaped and sized to produce a centered indentation in the soil block for seed placement or transplantation therein. The shape and size of the dibble 26 is selectable. The dibble 26 may be fixedly joined to bottom 30 of the base 24 for ease of removable for repair or replacement of the dibble 26 alone.

As shown in FIGS. 1 and 2, the plunger device 10 optionally includes one or more coupling ports 32. The coupling port 32 may be used to join together two or more plunger devices 10, such as plunger set 34 shown in FIGS.

3 and 4. The coupling ports 32 may be located on the joining body 18 such that the plunger devices 10 may be removably joined together to form a handle for the plunger set 34 with screws, bolts, or other plunger device attachment means.

Figure 3:
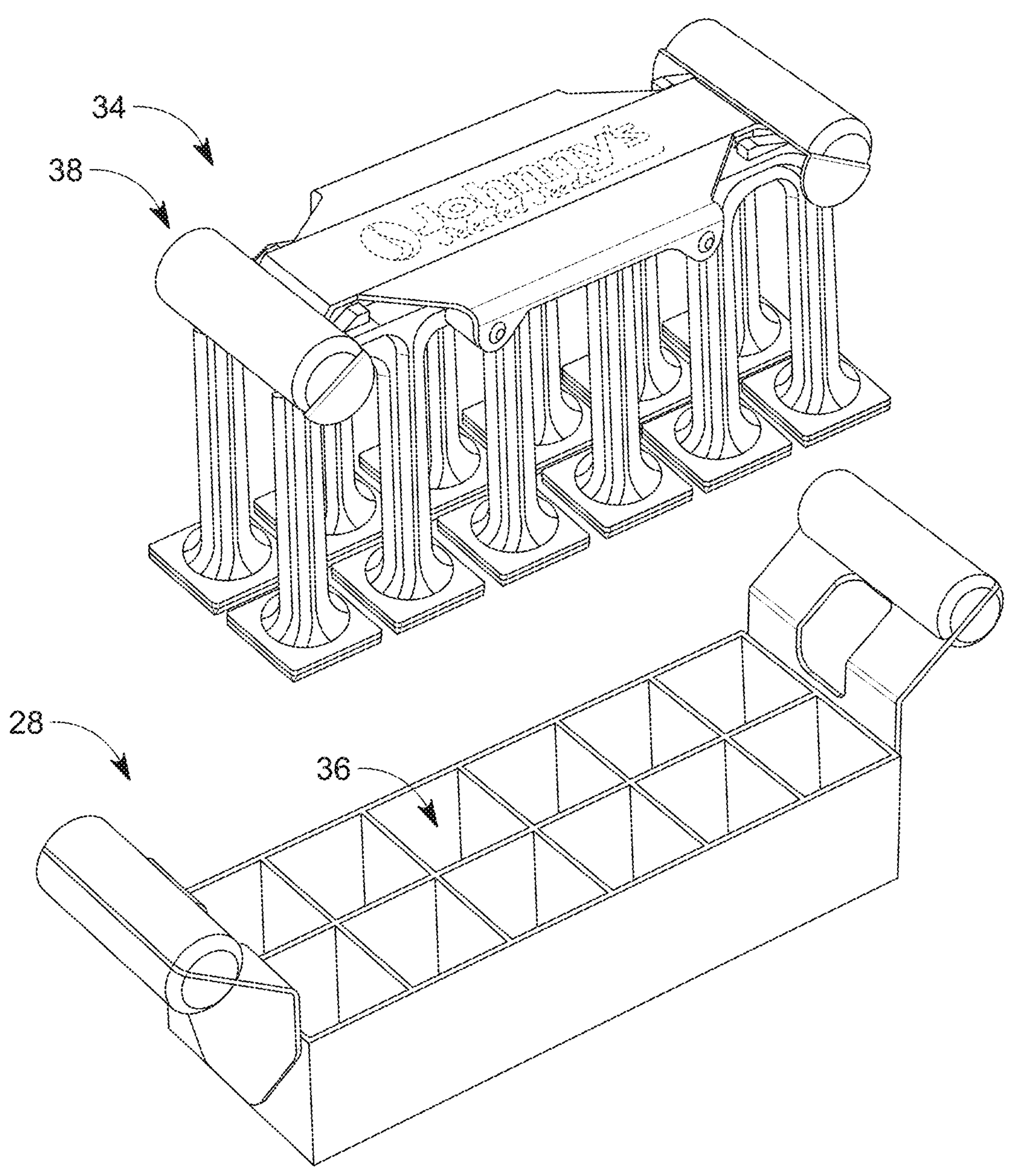
FIG. 3 is a perspective view of an example of a set of plunger devices of the first embodiment of the present invention joined together and spaced from a blocking grid.
Figure 4:
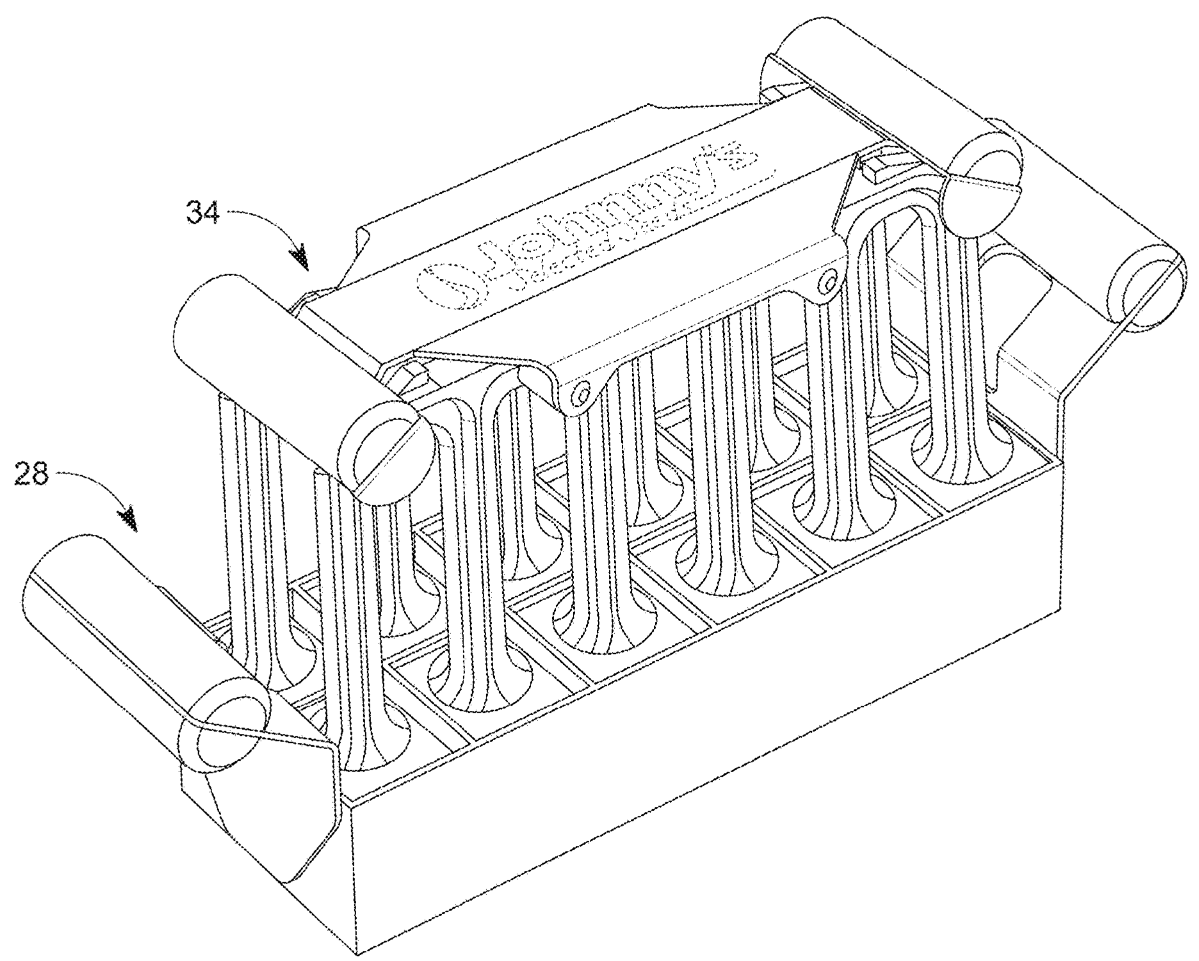
FIG. 4 is a perspective view of the example set of joined plunger devices of FIG. 3 positioned in the blocking grid.

With reference to FIGS. 3 and 4, the plunger set 34 including a plurality of the plungers 12 can be used to form a plurality of soil blocks within frame cells 36 of the grid frame 28. The end caps 22 of the plungers 12 are shaped, sized, and arranged to fit within the frame cells 36 substantially and uniformly with the application of hand pressure to handle 38. The handle 38 may be fixedly or removably joined to the joining bodies 18 of adjacent plungers 12.

The main body 11, the upper section 12, the lower section 14, the end cap 22 of the plunger device 10 are made of a rigid material sufficient to substantially maintain their shape with minimal deflection when pressure is applied to the handle 38 to compress soil with the frame cells 36 when producing soil blocks in the frame cells 36. Optionally or additionally, the main body 11 may include one or more structural flanges 40 to increase structural integrity of the plunger 12.

The material used to make the main body 11, the upper section 12, the lower section 14, and the end cap 22 may be the same or different for some or all of those portions of the plunger 12. The plunger 12 may be made by casting or molding the components thereof in a single casting or molding or in a plurality of castings or moldings. The material of the plunger 12 may be one or more of a metal and a nonmetallic material, such as Aluminum, Steel, or High Density Polyethylene, but not limited thereto. The plunger 12 and the end caps 22 may be made of the same or different materials.

Figure 5:
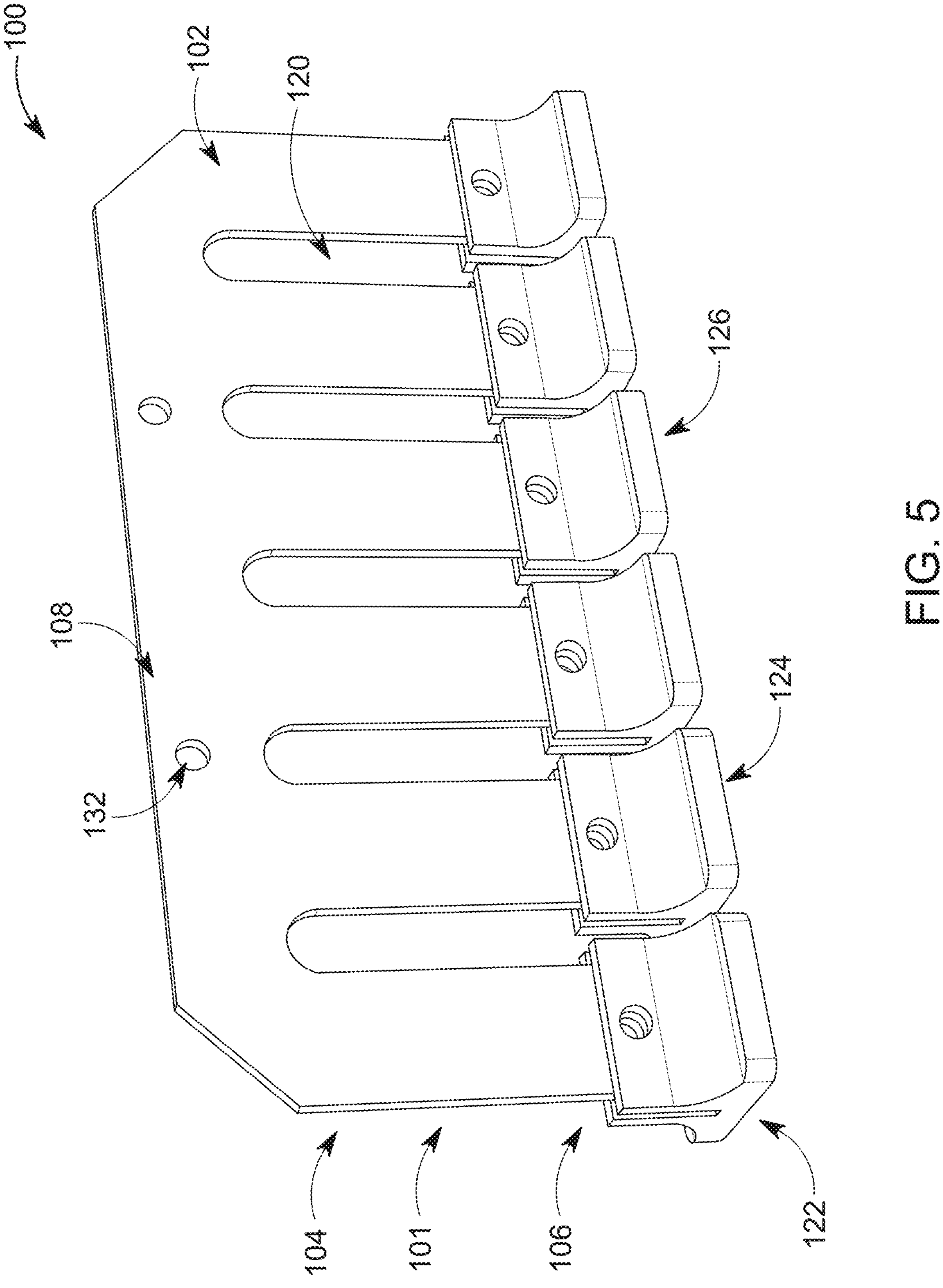
FIG. 5 is a perspective side view of a second embodiment of the plunger device including the end caps, which may be molded end caps as shown.

A second embodiment of a soil blocking plunger device 100 of the present invention is shown in FIG. 5. The plunger device 100 is shown as a single row of a plurality of plungers 102. Each plunger 102 has a main body 101 with an upper section 104, and a lower section 106. The upper sections 104 of each plunger 102 are joined together at joining body 108. That is, the plungers 102 are joined together, but they are only joined together at their upper sections 104. The plungers 102 are spaced from another by space 120 wherein the lower sections 106 are not joined to each other. The spacing of one plunger from an adjacent plunger defined by space 120 is selectable and may be determined by the desired size of a soil block to be formed. The plunger device 100 is a unitary substantially flat structure wherein its components are formed as a single unit by casting or molding as defined herein.

Figure 6:
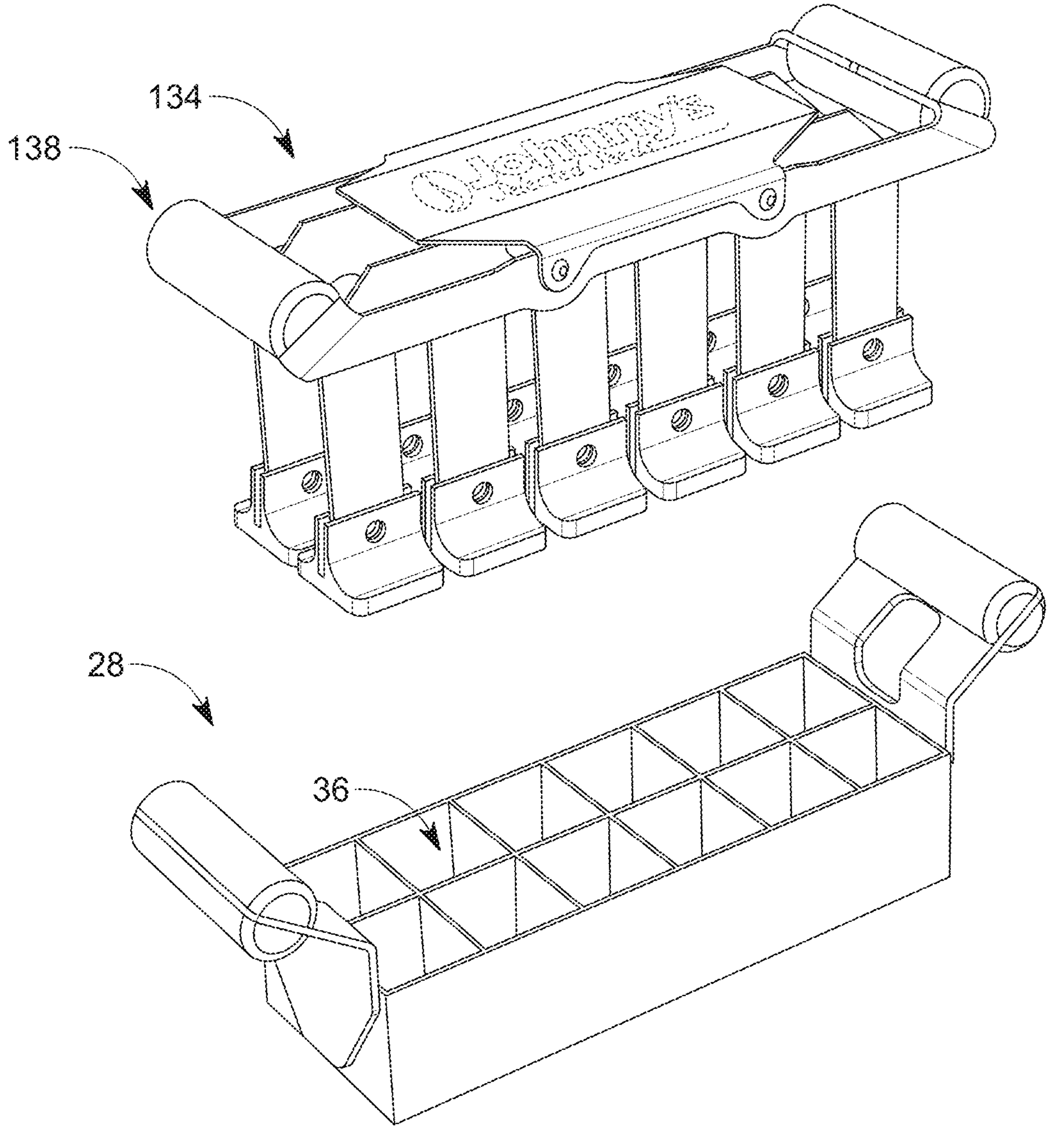
FIG. 6 is a perspective view of an example of a set of plunger devices of the second embodiment of the present invention joined together and spaced above the blocking grid.
Figure 7:
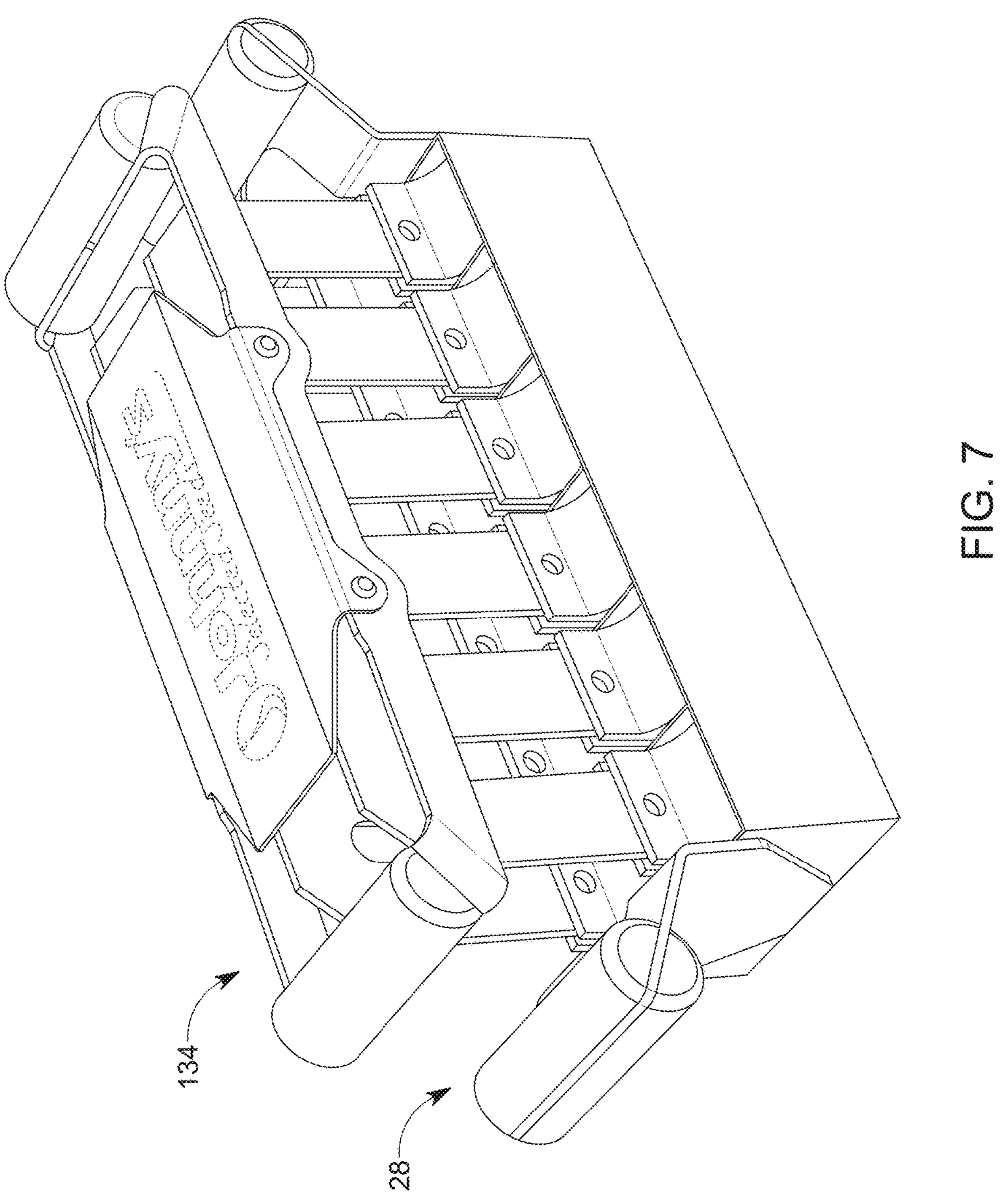
FIG. 7 is a perspective view of the example set of joined plunger devices of FIG. 6 positioned in the blocking grid.

The lower section 106 of each plunger 102 is joined to an end cap 122. The end cap 122 may be fixedly or removably joined to the lower section 106 of the plunger 102. For example, if there is an interest in changing the shape of a soil block to be formed or if an end cap 122 is damaged or worn, for example, the damaged one may be removed and replaced with a new or repaired one that may be removably joined to the lower section 106 of the plunger 102. The end cap 122 includes a base 124 and a dibble 126. The base 124 is shaped to fit snugly within the grid frame 28 to form one or more soil blocks as shown in FIGS. 6 and 7. The dibble 126 is shaped and sized to produce a centered indentation in the soil block for seed placement or transplantation therein and is essentially the same as the dibble of the first embodiment of the invention. The shape and size of the dibble 126 is selectable. The dibble 126 may be fixedly joined to bottom 130 of the base 124 for ease of removable for repair or replacement of the dibble 126 alone.

As shown in FIG. 5, the plunger device 100 optionally includes one or more coupling ports 132. The coupling ports 132 may be used to join together two or more plunger devices 100, such as plunger set 134 shown in FIGS. 6 and 7. The coupling ports 132 may be located on the joining body 108 such that the plunger devices 100 may be removably joined together to form a handle for the plunger set 134 with screws, bolts, or other plunger device attachment means.

With continuing reference to FIGS. 6 and 7, the plunger set 134 including a plurality of the plungers 102 can be used to form a plurality of soil blocks within frame cells 36 of the grid frame 28. The end caps 122 of the plungers 102 are shaped, sized, and arranged to fit within the frame cells 36 substantially and uniformly with the application of hand pressure to handle 138. The handle 138 may be fixedly or removably joined to the joining bodies 108 of adjacent plungers 102.

The main body 101, the upper section 104, the lower section 104, the end cap 122 of the plunger device 100 are made of a rigid material sufficient to substantially maintain their shape with minimal deflection when pressure is applied to the handle 138 to compress soil with the frame cells 36 when producing soil blocks in the frame cells 36. Optionally or additionally, the main body 101 may include one or more structural flanges 40 to increase structural integrity of the plunger 12. The main body 101, the upper section 104, the lower section 106, and the joining body 108 may each be about 1/16-th of an inch or more in thickness.

The material used to make the main body 101, the upper section 102, the lower section 14, and the end cap 22 may be the same or different for some or all of those portions of the plunger 12. The plunger 102 may be made of machine-cut sheet metal, stainless steel, or aluminum, but not limited thereto. Alternatively, the plunger 102 may be made by casting or molding of one or more other materials. The components of the plunger 102 as described may be made in a single structural form or in a plurality of structural forms. The plunger 102 may optionally be made of nonmetallic material including, for example, Carbon Fiber. The end caps 122 may be made of the same or different materials. The end caps 122 may optionally be made of another nonmetallic material such as a plastic material such as High Density Polyethylene or other nonmetallic material with sufficient structural integrity for the device 100 to operate as intended over a reasonable life cycle.

While the present invention has been described with respect to specific configurations, it is not intended to be limited thereto.

What is claimed is:

1. A soil blocking plunger device comprising:

a joining body comprising a first corner chamfer and a second corner chamfer;

a first handle disposed over at least a portion of the first corner chamfer;

a second handle disposed over at least a portion of the second corner chamfer; and a plurality of plungers joined together by the joining body, wherein each plunger of the plurality of plungers includes a main body with an upper section, a lower section, and an end cap joined to the lower section, wherein the upper section of each plunger is joined to the joining body, wherein the lower sections of each plunger are spaced from one another and not joined together;

wherein the main body, the upper section, the lower section, and the end cap of each plunger are each made of one or more materials of sufficient structural integrity to minimize deformation thereof when soil compressing force is applied to the joining body; and wherein the end cap of each plunger includes a base, wherein the base has a bottom configured to removably fit in a frame of a soil blocker frame cell substantially and uniformly with application of pressure to the joining body.

2. The plunger device of claim 1 wherein the joining body includes one or more coupling ports for coupling together a plurality of plunger devices at upper sections thereof.

3. The plunger device of claim 1 wherein a dibble is substantially centered on the bottom of the base and wherein the end cap is replaceably joined to the lower section of the plunger.

4. The plunger device of claim 1 wherein the main body of each plunger includes one or more structural flanges.

5. The plunger device of claim 1 wherein the main body, the upper section, the lower section, and the end cap of each plunger is made of a metal material.

6. The plunger device of claim 5 wherein the metal material is cast or molded.

7. The plunger device of claim 5 wherein the metal material is Aluminum.

8. The plunger device of claim 1 wherein the main body, the upper section, the lower section, and the end cap of each plunger is made of a nonmetallic material.

9. The plunger device of claim 8 wherein the nonmetallic material is cast or molded.

10. The plunger device of claim 8 wherein the nonmetallic material is Carbon Fiber.

11. The plunger device of claim 1 wherein the main body and the end cap of the plunger are made of different materials.

12. The plunger device of claim 1 wherein the joining body, the main body, the upper section, and the lower section together form a substantially flat member.

13. The plunger device of claim 12 wherein the joining body, the main body, the upper section, and the lower section are all about 1/16-th inch or more in thickness.

14. The plunger device of claim 1, further comprising: a grid frame comprising a plurality of soil blocker frame cells.

15. The plunger device of claim 14, wherein each soil blocker frame cell of the plurality of soil blocker frame cells is of a generally rectangular shape.

16. The plunger device of claim 14, wherein the end cap of each plunger is of a generally rectangular shape less than but substantially the same as the generally rectangular shape of the soil blocker frame cell to establish a snug fit of the end cap of the plunger in the soil blocker frame cell.

17. The plunger device of claim 14, further comprising: a pair of handles connected to the grid frame.

* * * * *